(12) United States Patent
Markle

(10) Patent No.: US 7,572,112 B2
(45) Date of Patent: Aug. 11, 2009

(54) MIXER DRIVE MOUNTING APPARATUS AND METHOD

(75) Inventor: Stephen L. Markle, Holley, NY (US)

(73) Assignee: SPX Corporation, Charlotte, NC (US)

( * ) Notice: Subject to any disclaimer, the term of this patent is extended or adjusted under 35 U.S.C. 154(b) by 322 days.

(21) Appl. No.: 11/024,450

(22) Filed: Dec. 30, 2004

(65) Prior Publication Data

US 2006/0153701 A1 Jul. 13, 2006

(51) Int. Cl.
*F04B 17/00* (2006.01)
*F04B 35/00* (2006.01)
(52) U.S. Cl. .................. 417/360; 417/359; 415/126
(58) Field of Classification Search .......... 417/360, 417/359; 415/201, 126; 454/355
See application file for complete search history.

(56) References Cited

U.S. PATENT DOCUMENTS

| 2,619,021 | A | * | 11/1952 | PFautsch | 454/292 |
| 3,425,621 | A | * | 2/1969 | Greenheck | 417/362 |
| 3,871,795 | A | * | 3/1975 | Habdo et al. | 417/360 |
| 4,523,897 | A | * | 6/1985 | Lower et al. | 417/244 |
| 4,579,494 | A | * | 4/1986 | Bierwith | 411/512 |
| 5,185,941 | A | * | 2/1993 | Dongelmans | 417/360 |

* cited by examiner

*Primary Examiner*—Devon C Kramer
*Assistant Examiner*—Peter J Bertheaud
(74) *Attorney, Agent, or Firm*—Baker & Hostetler LLP

(57) ABSTRACT

A drive mounting apparatus and method for mixing assemblies, such as a side-entry mixer, that can move the drive of a mixer between a closed position and an open position, and by doing so, can provide an access opening through which maintenance operations can be executed inside the mixer. The apparatus has a bearing housing and a pivoting mounting door. The drive is mounted to the pivoting mounting door, and the pivoting mounting door can move between an open and closed position relative to the bearing housing.

18 Claims, 4 Drawing Sheets

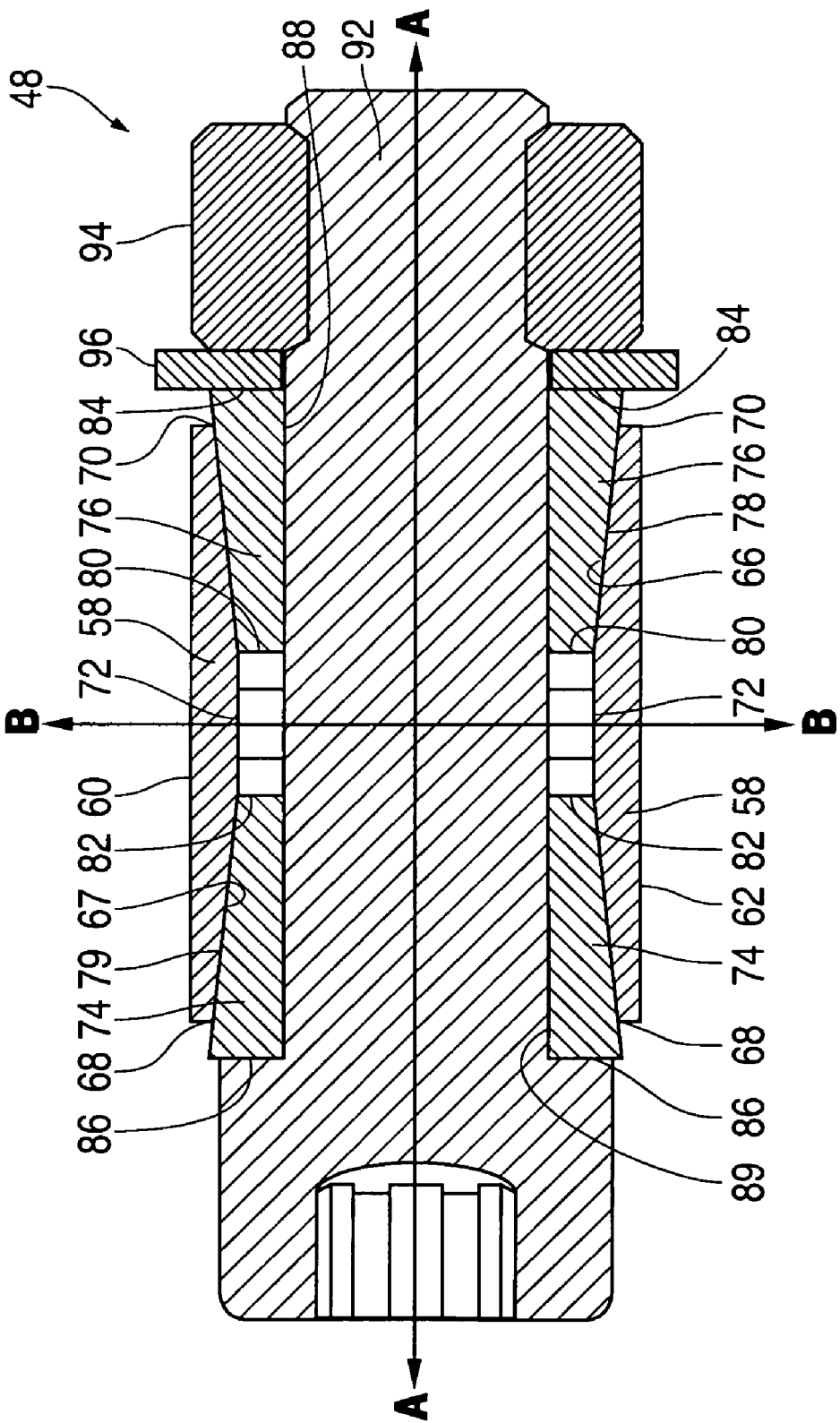

MIXER DRIVE MOUNTING APPARATUS AND METHOD

FIELD OF THE INVENTION

The present invention relates generally to mixing devices and drives for mixing devices. More particularly, the invention relates to an apparatus and method for mounting and dismounting a drive of a mixing device.

BACKGROUND OF THE INVENTION

A variety of mixing devices are used in industry. For example, certain mixers are used in operation with flue-gas desulfurization ("FGD") units, which are commonly used in the electric power generation industry to remove sulfur dioxide from flue-gas, where flue-gas is a byproduct of coal-fired electric power generation. It is desirable to remove the sulfur dioxide for pollution abatement purposes and because sulfur dioxide can be used to make a number of safe and useful products, such as gypsum.

Typically, FGD units include a large vessel in which slurry is stowed and mixed. The slurry, for example, may be a mixture of water and limestone. The slurry is mixed for the purpose of suspending the limestone in the slurry and to prevent the slurry from hardening and settling at the bottom of the vessel. Oftentimes, multiple mixing devices are employed at the same time to effectuate mixing within a single vessel, where each mixing device includes a drive that is mounted on the outside of the vessel and a horizontal impeller shaft that extends from the drive to the inside of the vessel. For example, the drive may be mounted to a bearing housing that is mounted on an outside-wall of the vessel, and the impeller shaft may be rotatably driven by the drive. Radially extending impellers are located at one or several locations on the length of the impeller shaft. The impellers have paddles or blade type features along some or all of their length and which mix the slurry inside the vessel.

In some instances, these mixing devices include a mechanical seal located between the impeller shaft and an opening formed in a sidewall of the vessel. The mechanical seal is configured to allow the impeller shaft to pass into the vessel by way of the aforementioned opening, yet prevent the contents of the vessel from escaping by way of the opening. It is typically desirable to provide such a seal so that the slurry does not flow in the bearing housing and come in contact with moving parts, such as bearings and gears. Periodically, the mechanical seal wears to the extent that it loses its effectiveness and needs to be replaced.

When the drive is mounted to the bearing housing, there is no access to the mechanical seal. A known way to provide access to the seal for replacement, is to disconnect and remove the drive and its associated parts from the end of the bearing housing. Removal of the drive creates a gap or access opening in the bearing housing where the drive was once mounted. This access opening provides a passageway through which the seal can be accessed and handled. For example, a mechanic can reach through the access opening and into the bearing housing where he can disconnect the seal. Once the seal is disconnected, the mechanic can then slide the seal off impeller shaft and then remove the seal via the access opening. However, this arrangement is disadvantageous because before the drive can be removed, an electrician must disconnect the drive leads and a millwright must remove the drive, both of which are time consuming and potentially expensive processes. The drive, including the motor, can be very heavy. Therefore, once the drive leads and drive have been removed, an overhead crane, or the like, is used to support the drive while it is disengaged from the bearing housing.

Another known way to provide an access opening through which the seal can be accessed and replaced is to provide a long bearing housing having a large side-opening located proximate to the seal. A spool piece is used to connect the impeller shaft to the drive output shaft. The spool piece is removable so that when it is removed, a gap is created between the impeller shaft and the drive output shaft. The spool piece is wide enough to leave a gap wide enough to permit at least a portion of the mechanical seal to pass therethrough. This arrangement is disadvantageous because it requires that the mechanic work adjacently beside the seal instead of directly behind the seal. Because the mechanic is forced to work beside the seal, the seal is difficult to access and handle. For example, the mechanic must reach across the impeller shaft and the entire face of the seal, and because the seal is large and heavy, it is difficult for a mechanic to dismount the seal from the impeller shaft, through the gap created by the spool, and through the side-opening.

Accordingly, it is desirable to provide a method and apparatus which can mount and dismount a drive system and alleviate the above mentioned disadvantages at least to some extent, and which can in some embodiments provide a mixer drive connection and also allow access via an access opening through which the mechanical seal can be easily handled and replaced.

SUMMARY OF THE INVENTION

The foregoing needs are met, to a great extent, by the present invention, wherein an apparatus is provided that in some embodiments provides a mixer drive mounting apparatus and method that can mount and dismount a drive of a mixer, and by doing so, can provide a mixer drive connection and also allow access via an access opening through which a mechanical seal can be easily handled and replaced.

In accordance with one aspect of the present invention, is an apparatus for mounting a drive. The apparatus comprises a bearing housing, a mounting door rotatably attached to the bearing housing that is movable between a closed position and an open position, and a fastener attachable to the mounting plate and the bearing housing that secures the mounting door in the closed position.

In accordance with another aspect of the present invention, is an apparatus for mounting a drive. The apparatus comprises a drive, a bearing housing, means for mounting the drive rotatably attached to the bearing housing configured to move the drive between an engaged position and a disengaged position, and means for fastening the means for mounting to the bearing housing in the engaged position.

In accordance with yet another aspect of the present invention, is a method for mounting a drive of a mixing device. The method comprises the steps of translating a mounting door from a open position to a closed position, aligning the mounting door with the bearing housing, and securing the mounting door to the bearing housing.

In accordance with still another aspect of the present invention, is a method for dismounting a drive of a mixing device. The method comprises the steps of disconnecting an alignment pin from a mounting door and a bearing housing, unfastening the mounting door from the bearing housing, moving the mounting door from a closed position to an open position.

In accordance with still another aspect of the present invention, is a system for mounting a drive. The system comprises a vessel having a vessel opening formed therein, an impeller shaft partially disposed inside the vessel, a mechanical seal disposed inside the vessel opening, where the mechanical seal is configured to allow the impeller shaft to extend therethrough, a bearing housing attached to the vessel having a pivoting mounting door that is movable between a closed position and an open position, and a drive attached to the pivoting mounting door having a drive shaft extending therefrom, wherein the drive shaft and the impeller shaft align when the pivoting mounting door is in the closed position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a cross-section view taken through line 4-4 in FIG. 3 illustrating the expanding pin assembly.

DETAILED DESCRIPTION

Figure 1:
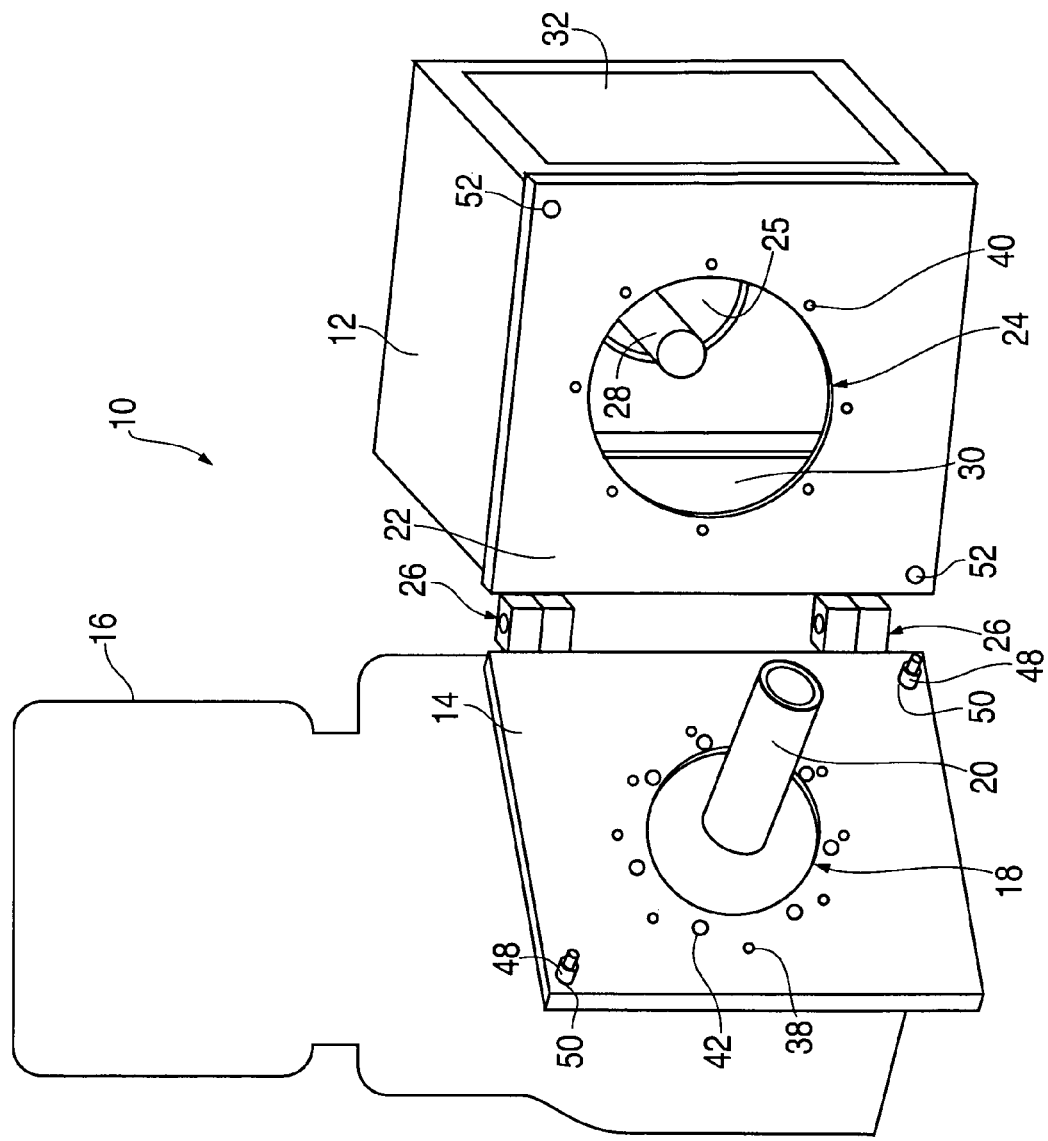
FIG. 1 is a partial perspective view illustrating a drive mounting apparatus in an open position according to a preferred embodiment of the invention.

An embodiment in accordance with the present invention provides a drive mounting apparatus and method for mixing assemblies, such as a side-entry mixer, that is movable between a closed position and an open position, and by doing so, can provide an access opening through which maintenance operations can be executed. The invention will now be described with reference to the drawing figures, in which like reference numerals refer to like parts throughout.

Figure 2:
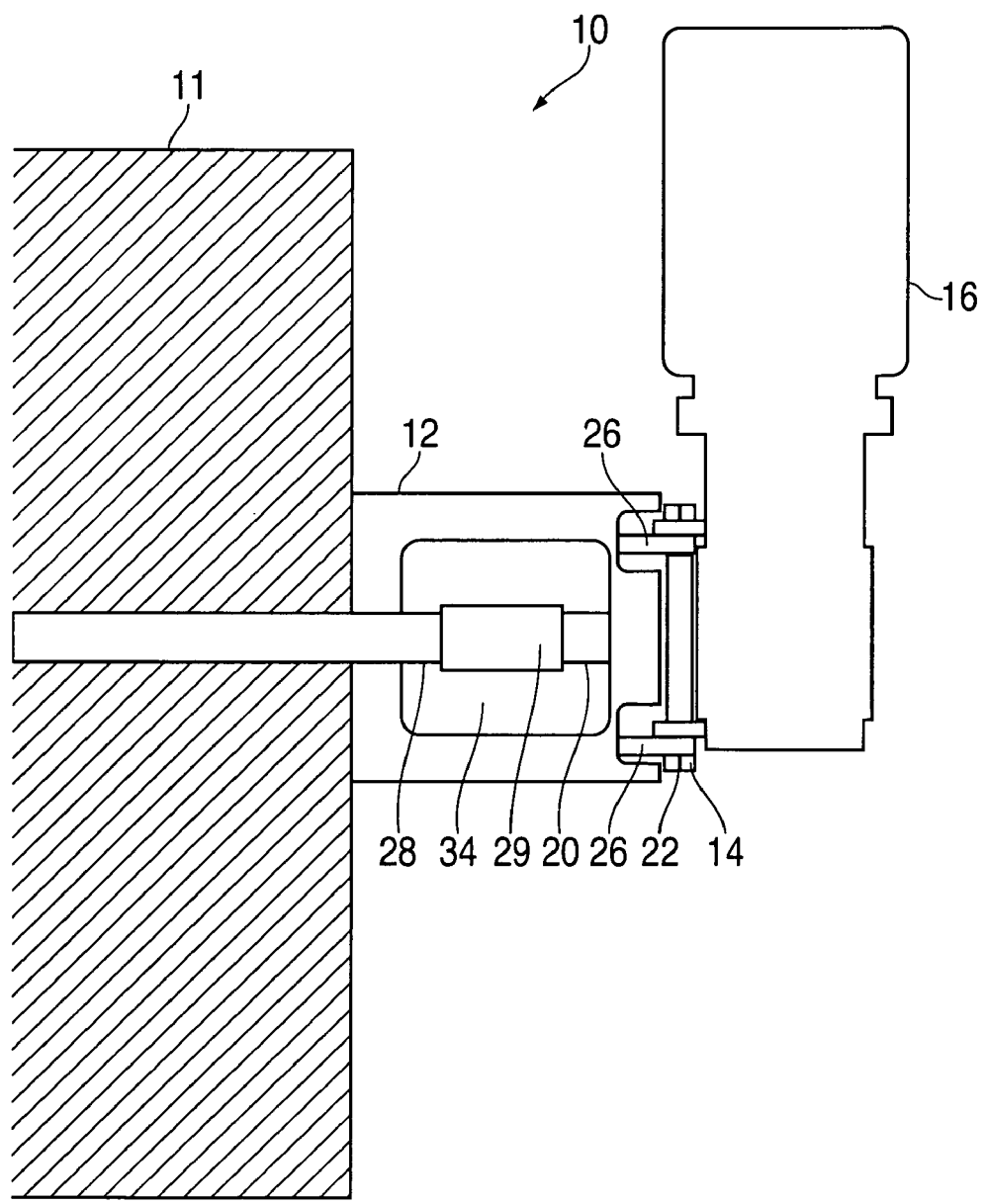
FIG. 2 is a side view of the drive assembly of FIG. 1 in an closed position.

FIGS. 1 and 2 illustrate a mixer 10 having a vessel 11, a bearing housing 12, a pivoting mounting door 14, and a drive 16. As seen in FIG. 1, the drive 16 is fixedly attached to the pivoting mounting door 14, and the pivoting mounting door 14 has a first opening 18 formed therein so the output shaft 20 of the drive 16 can pass therethrough. As further illustrated in FIG. 1, the bearing housing 12 includes a rigid mounting plate 22 fixedly attached thereto having a second opening 24 formed therein. The second opening 24, among other things, allows the output shaft 20 of the drive 16 to pass therethrough into the bearing housing 12.

The pivoting mounting door 14 is rotatably attached, by hinges 26, to the rigid mounting plate 22 and, thereby, the pivoting mounting door 14 is rotatably attached to the bearing housing 12. The foregoing hinged arrangement enables the pivoting mounting door 14 to move between closed and open positions. When the pivoting mounting door 14 is in the closed or engaged position, the second opening 24 provides a passageway through which the output shaft 20 can pass into the bearing housing 12 where it aligns with and engages the impeller shaft 28. In the preferred embodiment, a split coupling 29 connects the output shaft 20 to the impeller shaft 28. Further, when the pivoting mounting door 14 is in the closed or engaged position, the second opening 24 is closed off by at least the pivoting mounting door 14, the drive 16, and the output shaft 20. Thus, when the pivoting mounting door 14 is closed and the drive is mounted, there is no access to the inside portion of the bearing housing 12. On the other hand, when the pivoting mounting door 14 is open or disengaged, the second opening 24 is free from obstruction and, thus, the second opening 24 provides an access passageway to the inside portion of the bearing housing 12.

The passageway created by the second opening 24 when the door 14 is open can enable access to the inside of the bearing housing 12, where various maintenance or repair procedures can be executed. For example, a mechanic can reach through the opening 24 and into the bearing housing 12 where he can access a mechanical seal 25 that is located on and around the impeller shaft 28, and, thereby, dismount the mechanical seal from the end of the impeller shaft 28 and out of the bearing housing 12 via the second opening 24.

As shown in FIG. 1, the bearing housing 12 includes removable side panels 30 and 32. Referring now to FIG. 2, the bearing housing 12 is shown having the removable panel 30 removed therefrom. When the removable panel 30 is removed from the bearing housing, a third opening 34 is created. The third opening 34 provides access to the inside of the bearing housing 12. Also shown in FIG. 2, is the pivoting mounting door 14 in an engaged position such that it is in flush contact with the rigid mounting plate 22. When the pivoting mounting door 14 is in the closed or engaged position as shown in FIG. 2, the second opening 24 provides a passageway through which the output shaft 20 can pass into the bearing housing 12 where it can engage the impeller shaft 28. In the preferred embodiment, a split coupling 29 couples the output shaft 20 to the impeller shaft 28. Also in the preferred embodiment, the impeller shaft 28 extends from the bearing housing 12 into the vessel 11. The split coupling 29 can be installed or uninstalled via the operator accessing it through the third opening 34 when the side panel 30 is removed.

Referring again to FIG. 1, in the preferred embodiment, a plurality of fasteners secure the pivoting mounting plate in the closed position. For example, a plurality of first bolting holes 38 can be formed in the pivoting mounting door 14 and a plurality of second bolting holes 40 can be formed in the rigid mounting plate 22. The first and second bolting holes 38 and 40 can be positioned such that they align with one another when the pivoting mounting door 14 is in an engaged position such that it is in flush contact with the rigid mounting plate 22. When the pivoting mounting door 14 is in an engaged position, fasteners such as, for example, bolts can be disposed in the aligned first and second bolting holes 38, 40 and, thereby, secure the pivoting mounting door 14 in the closed position. It should be appreciated that other fastening means can be employed to secure the mounting door 14 to the rigid mounting plate 22. For example, when the pivoting mounting door 14 is in the closed position, clamping devices can be fastened along the outer perimeter of the connected pivoting mounting door 14 and the rigid mounting plate 22 and, thereby, secure the pivoting mounting door 14 in the engaged or closed position. It should be further appreciated that a latching system can secure the pivoting mounting door 14 in a closed position.

In the preferred embodiment, bolts can be used to mount the drive 16 to the pivoting mounting door 14. As shown in FIG. 1, a plurality of mounting holes 42 are formed in the pivoting mounting door 14. Fasteners such as, for example, bolts can be positioned such that they pass through the mounting holes 42 and extend into the drive 16 such that they are secured therein and, thus, the drive 16 is mounted to the pivoting mounting door 14.

Also shown in FIG. 1 are expandable pins 48. When the pivoting mounting door 14 is in the engaged position such that it is in flush contact with the rigid mounting plate 22, the expandable pins 48 can be disposed inside the first and second aligning holes 50 and 52. When the expandable pins 48 are disposed in their respective aligning holes 50, 52, the expandable pins 48 can be expanded such that their respective outer diameters equals the respective inner diameters of the aligning holes 50, 52. When the expandable pins 48 are expanded such that their outer diameters equal the inner diameters of the aligning holes 50, 52, the aligning holes 50, 52 are precisely aligned with one another. Because the pivoting mounting door 14 and the rigid mounting plate 22 have substantially similar dimensions, and aligning hole 50, 52 are at aligned locations formed therein, the pivoting mounting door 14 and the rigid mounting plate 22 are precisely aligned with one another when their respective aligning holes 50, 52 are precisely aligned with one another.

Figure 3:
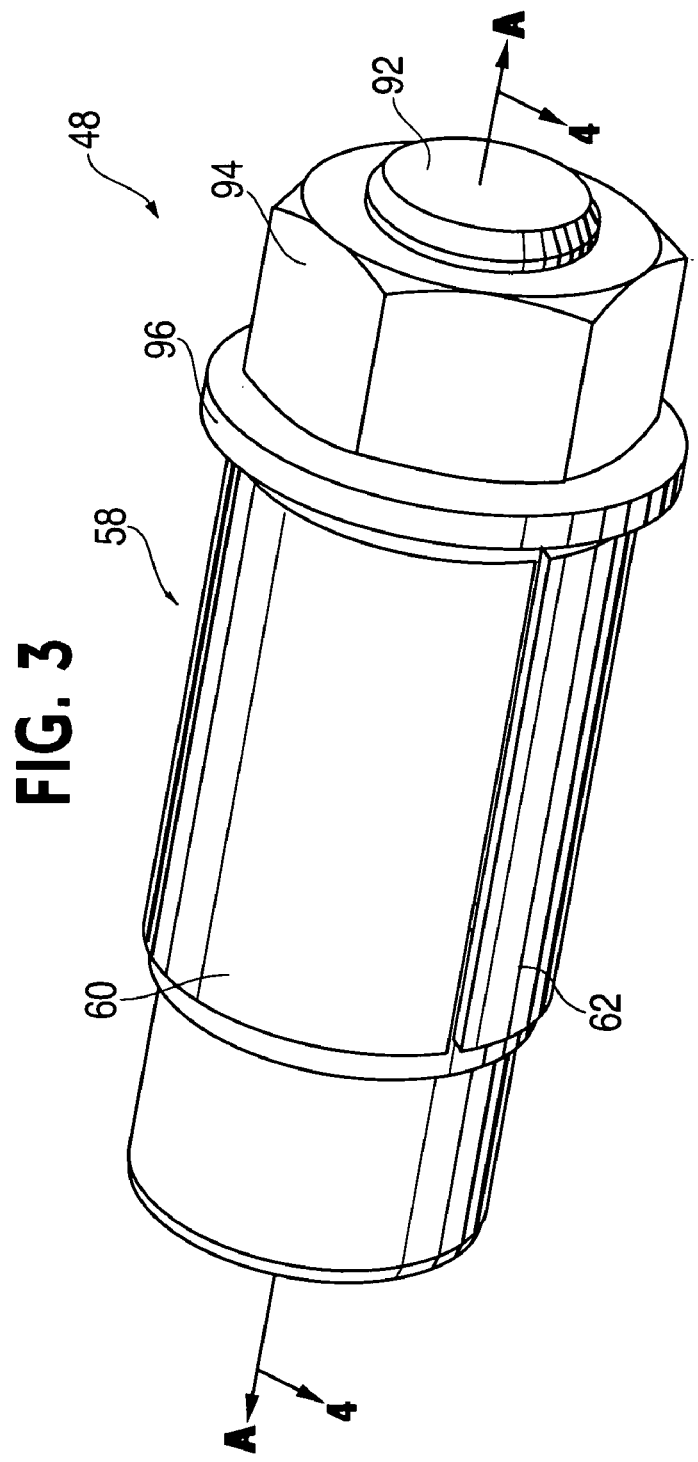
FIG. 3 is a perspective view illustrating an expanding pin assembly according to a preferred embodiment of the invention.

As shown in FIG. 3, the expandable pins 48 each include a split-tube 58, and the split-tube 58 is split along the line indicated by line A such that it is divided into independent symmetrical halves 60, 62. Referring now to FIG. 4, the size of the inner diameter 66, 67 of the split-tube 58 varies relative to its position along the line indicated by line A. For example, the largest inner diameter of the split-tube 58 is located at its respective ends 68, 70, and its smallest inner diameter is located at its middle 72. Further, the inner diameter of the split-tube 58 gradually reduces at a constant rate from its respective ends 68, 70 to its middle 72. The split-tube 58 is also symmetrical relative to vertical axis B and, thus, the diameter at 68 is equal to the diameter at 70.

The expandable pin 48 further includes two annular wedges 74, 76, each having a varying outer surface 78, 79 configured to correspond with the split-tube's 58 varying inner surface 66, 67. A portion of each annular wedge 74, 76 is disposed inside the split-tube 58. For example, portions 80, 82, where the diameter of the outer surface 78 is smallest, are located proximate to the middle 72 of the split-tube 58. Portions 84, 86, where the outer surface's 78 diameter is largest, are located outside of the split-tube 58. The annular wedges 74, 76 each have an inner surface 88, 89 having a constant diameter. A bolt 92 is disposed parallel to the direction indicated by the line A and extends throughout both inner surfaces 88, 89. The bolt 92 is secured by a nut 94. The annular wedge 76 can include a flanged portion 96 that distributes the compression load created by the bolt 92 and nut 94.

The bolt 92 and nut 94 combination can place the annular wedges 74, 76 into compression and, thus, the annular wedges 74, 76 can move along the line indicated by line A toward each other. When the annular wedges 74, 76 move in opposite directions along the line indicated by line A such that they are moving toward each other, the halves 60, 62 of the split-tube 58 move in opposite directions along the line indicated by line B such that they move away from each other and, thus, the outer diameter of the split-tube 58 can radially expand.

In the preferred embodiment, the user performs the following steps to close/engage the pivoting mounting door 14. First, the user swings the pivoting mounting door 14 from an open position to a closed position where it can be fastened to the rigid mounting plate 22. Next, the user removes the removable panels 30, 32 such that he can access the side of the rigid mounting plate 22 that faces the inside of the bearing housing 12. Next, the user partially fastens the pivoting mounting door 14 to the rigid mounting plate 22. More specifically, the user inserts and partially secures bolts through the corresponding holes 38, 40 formed in the pivoting mounting door 14 and the rigid mounting plate 22. The user can access the bolts and, thereby, secure the bolts via the openings provided by the removable panels 30, 32.

Next, the user precisely aligns the pivoting mounting door 14 and the rigid mounting plate 22 with one another. More specifically, the user inserts the expandable pins 48 through openings 50, 52 formed in the pivoting 14 and rigid 22 mounting plates. Then the user places the annular wedges 74, 76 in compression by tightening each expandable pin's 48 bolt 92 and nut 94 combination such that the split tube 58 radially expands and, thereby, precisely aligns the holes 50 and 52 with one another. Because the plates 14 and 22 have substantially similar dimensions and hole 50, 52 locations, the plates 14 and 22 are precisely aligned with one another when the holes 50, 52 are precisely aligned with one another. Next, the user securely fastens the bolts and installs the removable panels 30, 32.

In the preferred embodiment, the user performs the following steps to open/disengage the pivoting mounting door 14. First, the user partially unfastens the bolt 92 and nut 94 combination such that the diameter of the split tube 58 radially contracts. Then, the user removes the pins 48 from holes 50 and 52. Next, the user unfastens and removes the bolts from holes 38 and 40. Finally, the user rotates the pivoting mounting door 14 from the closed position to the open position.

Although the drive mounting apparatus and method is useful to provide access to mechanical seals located with in bearing housings it can also be used to provide access to other parts within a mixing assembly. Also, although an example of the drive mounting apparatus and method is shown in combination with mixing devices having drives, it will be appreciated that it can be utilized in other devices where it is necessary to provide access for repair and maintenance operations.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for mounting a drive for driving an impeller shaft supported through a vessel wall by a mechanical seal through which the shaft extends, comprising:
   a bearing housing outside the vessel wall and surrounding the mechanical seal, the bearing housing defining a second opening, and a third opening;

a mounting door having a first opening and pivotally attached by a hinge to the bearing housing that is outside the vessel wall and is movable between a closed position closing the second opening and preventing access to the mechanical seal from outside the bearing housing and an open position permitting access to the mechanical seal from outside the bearing housing and removal of the mechanical seal through the second opening;

a motor mounted to the mounting door and an output shaft extending from the motor through the first opening;

an input shaft portion of the impeller shaft projecting outside of the vessel through the mechanical seal, wherein in the closed position the output shaft is positioned to drive the input shaft portion of the impeller shaft; and a fastener attachable to the mounting door and the bearing housing that secures the mounting door in the closed position;

a removable cover adapted to be mounted only to the bearing housing and removably cover the third opening; and a split coupling having one-half on the motor output shaft and one-half on the input portion of the impeller shaft, to rotationally couple the output shaft and the impeller shaft together when the mounting door is pivoted in the closed position, and which halves disengage from each other when the mounting door is in the open position, wherein the third opening is configured to permit access, when the mounting door is in the closed position, from outside of the bearing housing for assembly and disassembly of the split coupling, and the removable cover is adapted to cover the third opening so that the bearing housing is completely enclosed when the removable cover is installed and the mounting door is in the closed position.

2. The apparatus of claim 1, wherein the drive is mounted to the mounting door.

3. The apparatus of claim 1, further comprising a vessel to which the bearing housing is mounted.

4. The apparatus of 3, wherein the shaft is an impeller shaft that is rotated by the drive, wherein a portion of the impeller shaft is located inside the vessel.

5. The apparatus of claim 1, further comprising a plurality of hinges, wherein a portion of the bearing housing and a portion of the mounting door are attached to the hinges.

6. The apparatus of claim 1, further comprising a plurality of first fastening holes formed in the bearing housing and a plurality of second fastening holes formed in the mounting door, wherein the respective first and second fastening holes are proximately aligned so that the fastener can pass therethrough when the mounting door is in the closed position.

7. The apparatus of claim 1, further comprising a first alignment hole formed in the bearing housing and a second alignment hole formed in the mounting door, wherein the first and second alignment holes are proximately aligned when the mounting door is in the closed position.

8. The apparatus of claim 7, further comprising an alignment pin, wherein the alignment pin extends through the first and second alignment holes.

9. The apparatus of claim 8, wherein the alignment pin is configured to precisely align the mounting door with the bearing housing.

10. An apparatus for mounting an impeller drive, comprising:

a drive for driving a shaft supported through a vessel wall by a mechanical seal through which the shaft extends;

a bearing housing outside the vessel wall and surrounding the mechanical seal, the bearing housing defining a second opening, and a third opening;

means for mounting the drive having a first opening and pivotally attached by a hinge to the bearing housing outside the vessel wall and configured to pivotally move the drive between an engaged position closing the second opening while preventing access to the mechanical seal from outside the bearing housing and a disengaged position while permitting access to the mechanical seal from outside the bearing housing and removal of the mechanical seal through the second opening;

a motor mounted to the mounting door and an output shaft extending from the motor through the first opening;

an input shaft portion of the impeller shaft projecting outside of the vessel through the mechanical seal, wherein in the closed position the output shaft is positioned to drive the input shaft portion of the impeller shaft; and means for fastening the means for mounting to the bearing housing in the engaged position:

a removable cover adapted to be mounted only to the bearing housing and removably cover the third opening; and a split coupling having one-half on the motor output shaft and one-half on the input portion of the impeller shaft, to rotationally couple the output shaft and the impeller shaft together when the mounting door is pivoted in the closed position, and which halves disengage from each other when the mounting door is in the open position, wherein the third opening is configured to permit access, when the mounting door is in the closed position, from outside of the bearing housing for assembly and disassembly of the split coupling, and the removable cover is adapted to cover the third opening so that the bearing housing is completely enclosed when the removable cover is installed and the mounting door is in the closed position.

11. The apparatus of claim 10, further comprising a plurality of first fastening holes formed in the bearing housing and a plurality of second fastening holes formed in the means for mounting, wherein the first and second securing holes are proximately aligned so that the means for fastening can pass therethrough when the means for mounting is engaged.

12. The apparatus of claim 10, further comprising a first alignment hole formed in the bearing housing and a second alignment hole formed in the means for mounting, wherein the first and second alignment holes are proximately aligned when the means for mounting is engaged.

13. The apparatus of claim 12, further comprising a means for aligning, wherein the means for aligning extends through the first and second alignment holes.

14. The apparatus of claim 13, wherein when the means for aligning is configured to precisely align the first and second alignment holes.

15. A method for mounting a drive for driving an impeller shaft supported through a vessel wall by a mechanical seal through which the shaft extends of a mixing device, comprising the steps of:

providing a bearing housing outside the vessel wall and surrounding the mechanical seal, the bearing housing defining a second opening, and a third opening;

providing a mounting door having a first opening and pivotally attached by a hinge to the bearing housing that is movable outside the vessel wall and is between a closed position closing the second opening and preventing access to the mechanical seal from outside the bearing housing and an open position permitting access to the mechanical seal from outside the bearing housing and removal of the mechanical seal through the second opening;

a motor mounted to the mounting door and an output shaft extending from the motor through the first opening;

an input shaft portion of the impeller shaft projecting outside of the vessel through the mechanical seal, wherein in the closed position the output shaft is positioned to drive the input shaft portion of the impeller shaft; and attaching a fastener to the mounting door and the bearing housing that secures the mounting door in the closed position, a removable cover adapted to be mounted only to the bearing housing and removably cover the third opening;

a split coupling having one-half on the motor output shaft and one-half on the input portion of the impeller shaft, to rotationally couple the output shaft and the impeller shaft together when the mounting door is pivoted in the closed position, and which halves disengage from each other when the mounting door is in the open position, wherein the third opening is configured to permit access, when the mounting door is in the closed position, from outside of the bearing housing for assembly and disassembly of the split coupling when the mounting door is in the closed position, and the removable cover is adapted to cover the third opening so that the bearing housing is completely enclosed when the removable cover is installed and the mounting door is in the closed position.

16. The method of claim 15, wherein the drive is mounted to the mounting door.

17. The method of claim 15, wherein the step of fastening comprises:

fastening the mounting door partially to the bearing housing;

contacting an expandable alignment pin with the mounting door and the bearing housing; and expanding the expandable alignment pin so that the mounting door precisely aligns with the bearing housing.

18. The method of claim 17, wherein fastening the mounting door to the bearing housing comprises:

providing a first hole in the mounting door and a second hole in the bearing housing; and bolting the mounting door and the bearing housing together via the first and second holes, wherein the bolting is partially tightened.

* * * * *